United States Patent [19]

Theurer et al.

[11] 4,135,631
[45] Jan. 23, 1979

[54] FREIGHT TRAIN

[75] Inventors: Josef Theurer, Vienna; Friedrich Öllerer, Linz, both of Austria

[73] Assignee: Franz Plasser Bahnbaumaschinen-Industriegesellschaft m.b.H., Vienna, Austria

[21] Appl. No.: 781,639

[22] Filed: Mar. 28, 1977

[30] Foreign Application Priority Data

May 31, 1977 [AT] Austria .................................. 3986/77

[51] Int. Cl.² ............................................. B65G 67/08
[52] U.S. Cl. .................................. 214/38 CA; 214/40; 214/41 R
[58] Field of Search ............. 214/38 R, 38 CA, 38 D, 214/40, 41 R; 104/2; 171/16

[56] References Cited

U.S. PATENT DOCUMENTS

| 1,918,419 | 7/1933 | Needham | 214/38 CA X |
| 3,154,203 | 10/1964 | Barry | 214/40 X |
| 3,323,663 | 6/1967 | Strader | 214/38 R |
| 3,376,988 | 4/1968 | Klosk | 214/38 CA X |
| 3,490,622 | 1/1970 | Brackin | 214/38 CA |

Primary Examiner—Albert J. Makay
Attorney, Agent, or Firm—Kurt Kelman

[57] ABSTRACT

A train of railroad cars for receiving, transporting and discharging bulk material comprises a succession of flat cars and a plurality of transport containers for the bulk material arranged on each of the car loading platforms in succession in the direction of the track. A mobile crane is mounted for movement along the train on rails laterally of the containers on the loading platforms. The crane grips respective containers and drives them selectively to and from loading and storage stations on respective ones of the flat cars whereby successive containers may be loaded with the bulk material and the loaded containers may be stored on the platforms of the cars.

6 Claims, 5 Drawing Figures

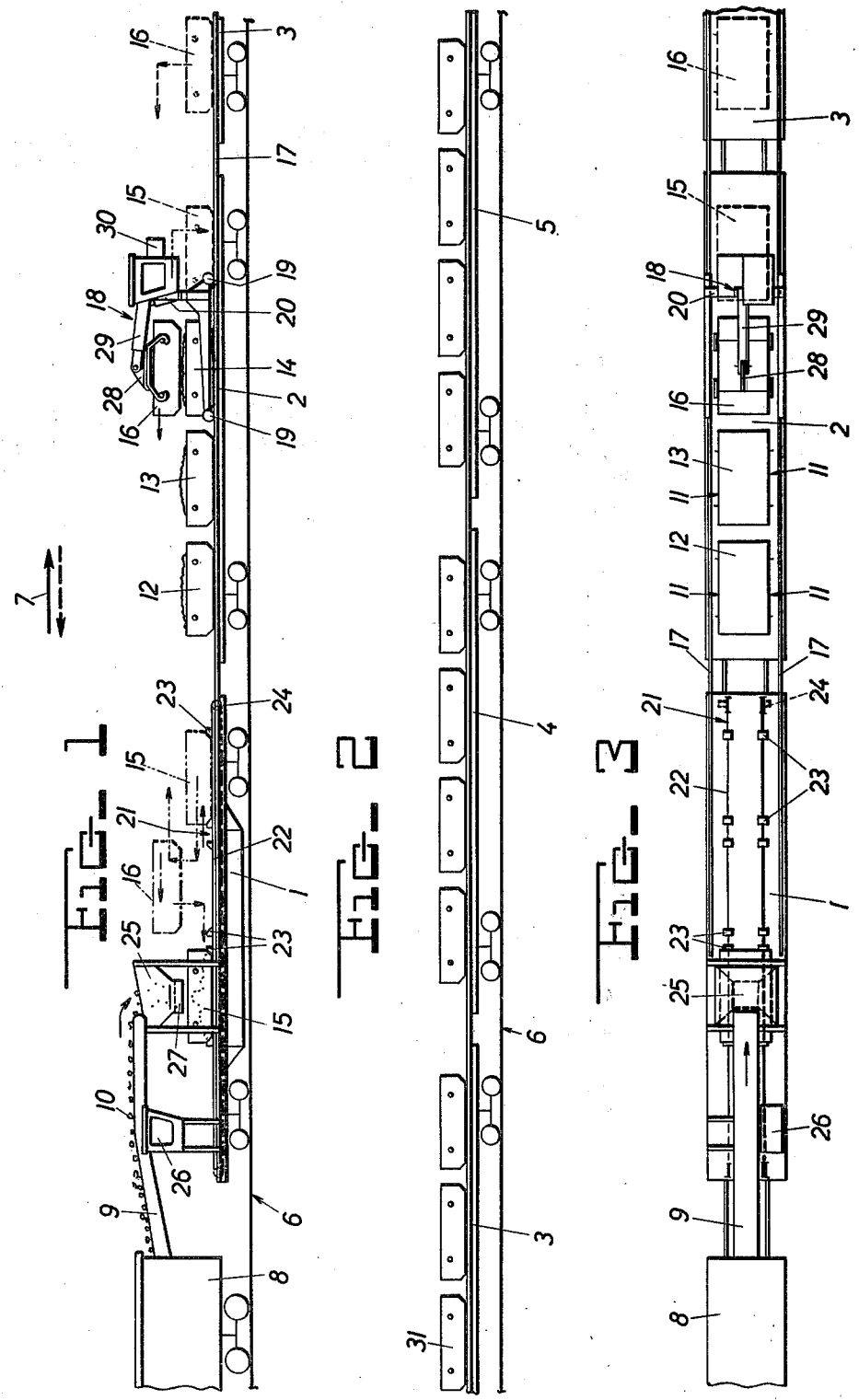

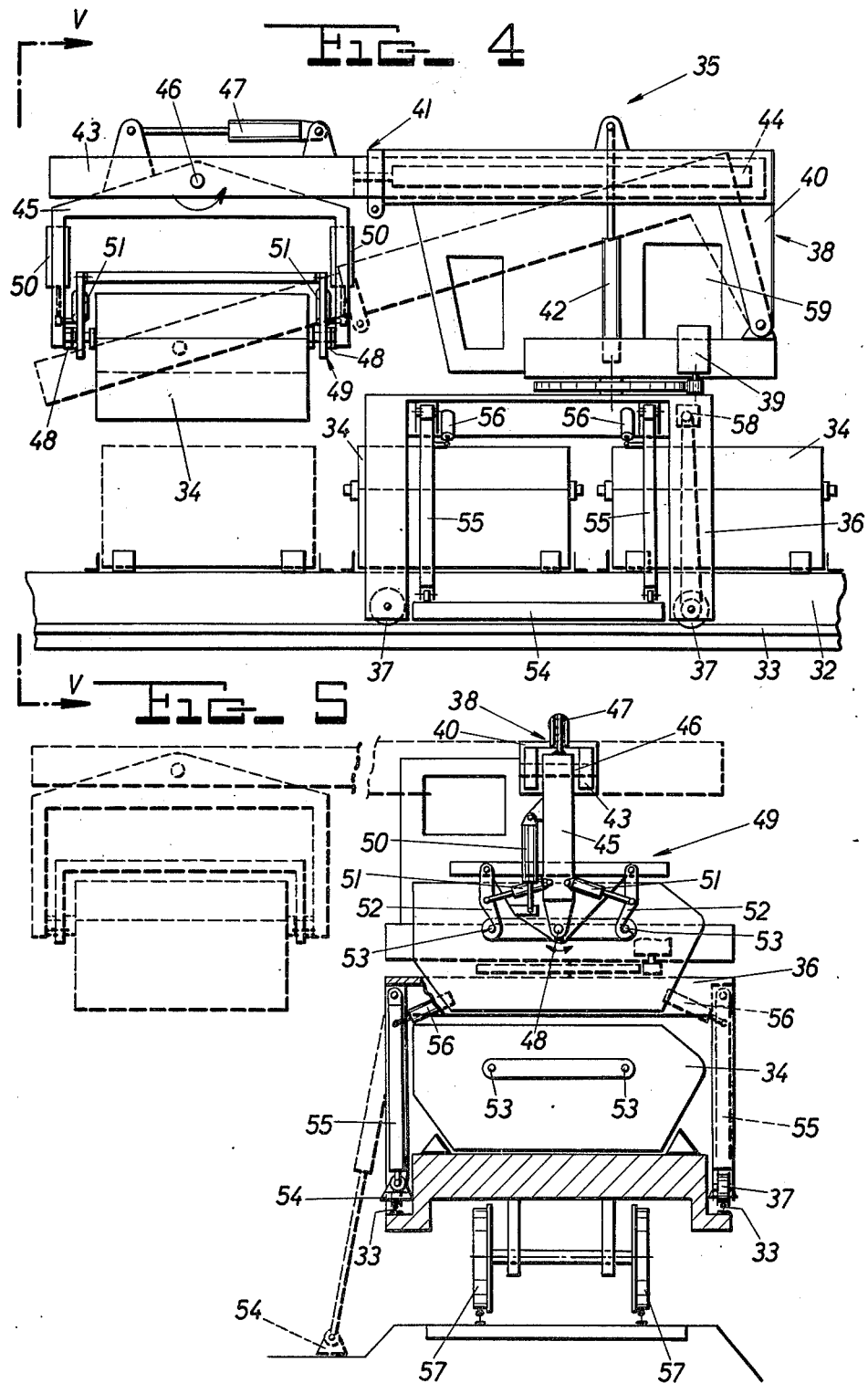

FREIGHT TRAIN

The present invention relates to a train of railroad cars for receiving, transporting and discharging bulk material, particularly waste coming from a ballast cleaning machine.

A known arrangement for removing waste coming from a ballast cleaning machine comprises a succession of cars with low rims and coupled together for movement along a track. Connecting sheet metal plates are placed over abutting ends of the cars to bridge the coupling spaces between the cars so as to provide a continuous runway for a self-propelled dump car. Furthermore, a hopper for receiving and temporarily storing the waste coming more or less without interruption from the ballast cleaning machine is mounted on the car adjacent the machine. At the beginning of the operation, the dump car is moved under the hopper where it is charged with the bulk material, and the loaded dump car is then driven along the runway to the flat car at the other end of the train where the material is discharged from the dump car, whereupon the dump car is returned along the runway to the hopper to renew the cycle. Thus, the waste material is continuously dumped onto successive ones of the low-rimmed cars until all of the cars are loaded with waste material. The hopper must be of sufficient size and strength to hold the amount of waste material accumulating while the dump car travels from the hopper to its discharge station. Furthermore, the loading and unloading cycle is relatively slow because only a single dump car can be used in this arrangement, there being no room on the runway for more than one such car to move back and forth. Finally, the capacity of this arrangement is limited not only by the number of cars that may be coupled together without unduly prolonging the time span within which the dump car moves between charging and discharging stations but also by the limited load capacity of the storage hopper and low-rimmed freight cars into which the waste material is dumped.

Machine arrangements have also been proposed to enable waste coming from ballast cleaning machines to be removed continuously. As disclosed in German Offenlegungsschrift (Published Patent Application) No. 2,348,015, such an arrangement comprises special silo cars and overhead conveyors. German Pat. No. 1,139,796 discloses a train of cars adapted to hold bulk material and a continuous overhead guide track assembled above the loading openings of the cars along which a plurality of successive conveyors may be moved in the direction of track elongation. The waste bulk material is continuously transported from one conveyor to an adjoining conveyor until it is discharged onto the loading platform of the cars by the conveyor farthest removed from the ballast cleaning machine. This arrangement makes a substantially continuous removal of bulk material possible and has been commercially successful but it requires special cars especially made for this purpose and is relatively complex in construction because of the multiplicity of components, such as a plurality of conveyor bands, drives and controls. Maintenance costs are correspondingly high, including the relatively frequent replacement of the conveyor bands on the many conveyors since these bands are rapidly worn by the nature of the waste material.

In addition, discharge of the bulk material in all the known machine arrangements requires additional apparatus, such as discharge chutes, tilting devices for the loading platforms of the cars in which the material is transported and, if the material is not to be discharged immediately adjacent the track from the cars, further expensive machinery, such as cranes or conveyor bands mounted below the car platforms for moving the waste material from the cars to a place removed from the immediate vicinity of the track.

It is the primary object of this invention to provide a train of railroad cars for receiving, transporting and discharging bulk material, particularly waste coming from a ballast cleaning machine, which avoid the above-indicated disadvantages, have a large capacity and enable very large amounts of bulk material to be loaded economically while reducing construction and maintenance costs to a minimum.

This and other objects are accomplished in accordance with the invention with a train comprising a succession of cars each having a loading platform coupled together for movement along a track, and a plurality of transport containers for the bulk material arranged on each of the loading platforms in succession in direction of the track, the successive loading platforms of the cars of the train defining a path for movement of the transport containers in the track direction. A mobile crane including a device for gripping, lifting and holding a respective one of the transport containers is mounted for movement therealong on a continuous track means extending along the train in the track direction laterally of the containers, and the crane is adapted to grip respective transport containers and continuously to drive the gripped containers selectively along the path to and from loading and storage stations on respective cars of the train wherein successive containers may be loaded with the bulk material and the loaded containers may be stored on the platforms of the cars.

With the use of a plurality of transport containers for the bulk material and a crane drive for the containers independent thereof, practically continuous loading has become possible since, while one container is being loaded at the loading station, a previously loaded container may be moved away and a successive container to be loaded may be moved towards the loading station. Accordingly, no massive hopper is required for intermediate storage of bulk material continuously delivered thereto, and since loading is substantially independent of the transport cycle, i.e. the drive time of the crane, the capacity of the train may be very high. Even large amounts of waste material accumulating rapidly may be continuously removed and distributed along the length of the train on its successive flat cars. Another advantage of this type of train is the possibility that no special cars are required but all sorts of readily available flat cars, low-rimmed cars and like freight cars may be used. The arrangement is structurally very simple, easy to operate and requires relatively little maintenance.

In addition, the development of dust, which is particularly prevalent when the waste material is conveyed on conveyor bands, is at least considerably reduced in view of the transportation of the material in containers. Therefore, the train can be arranged on previously cleaned track since no pollution of the cleaned ballast bed will occur.

The above and other objects, advantages and features of the invention will become more apparent from the following detailed description of certain now preferred embodiments thereof, taken in conjunction with the accompanying drawing wherein FIGS. 1 and 2, when viewed in horizontal alignment, show a schematic side elevation of a train of railroad cars for receiving, transporting and discharging bulk material, according to one embodiment of the present invention;

FIG. 3 is a top view of the portion of the train shown in FIG. 1;

FIG. 4 is an enlarged, partial side view of one of the cars, illustrating a different embodiment of transport container and mobile crane; and FIG. 5 is an end view, partly in section along line V—V of FIG. 4, of the embodiment of FIG. 4.

Referring now to the drawing and first to FIGS. 1 to 3, the train is shown to be comprised of a succession of cars 1, 2, 3, 4 and 5 each having a loading platform and coupled together for movement along track 6 in selectively reversible operating directions indicated by arrows 7. The train is arranged adjacent mobile track working machine 8 which also runs on track 6 and, in the illustrated embodiment, is a mobile ballast cleaning machine which comprises conveyor 9 which removes from the machine any bulk material 10 which may result from the work of the machine.

A plurality of transport containers 12, 13, 14, 15, 16 and 31 for the bulk material is arranged on each loading platform of the cars in succession in the direction of track 6 and the successive loading platforms of the cars of the train define a path for movement of the transport containers in the track direction. The transport containers have two parallel long sides and two short sides interconnecting the long sides, and in the embodiment of FIGS. 1 to 3, the containers are arranged on the platforms with their long sides substantially parallel to the track direction. A continuous track means extends along the train in this direction laterally of the containers, this track means comprising in this embodiment a pair of rails 17 supported on the platforms of the successive cars to the right and left of the containers arranged thereon, as shown in FIG. 3. Mobile crane 18 including device 28 for gripping, lifting and holding a respective one of the transport containers is mounted on undercarriages 19 movable on the rails, the crane being adapted to grip respective ones of the transport containers and continuously to drive the gripped containers selectively along the path to and from loading, storage and discharge stations on respective cars of the train whereby successive containers may be loaded with the bulk material and the loaded containers may be stored on the platforms of the cars.

Mobile crane 18 comprises gantry 20 permitting the transport containers, such as containers 12, 13 (see FIG. 1), to pass therethrough. Rails 17 bridge the spaces between the train cars and extend into the region of end car 1 which comprises the loading station.

The embodiment hereinabove described is structurally very simple and makes it possible to use standard flat or low-rimmed freight cars, requiring only rails 17 to be mounted on the car platforms to provide a continuous track means for mobile crane 18. Since relatively large, i.e. long, transport containers may be used, there are only short time intervals between successive loading times.

Elongated conveyor 21 is mounted on end car 1 for reversible movement in the direction of the track. The illustrated conveyor is a chain conveyor 22 which has entrainment elements or dogs 23 for entraining a container mounted on the endless conveyor, the conveyor being selectively movable in opposite directions by drive 24 to drive a respective transport container to and from the loading station upon movement of the conveyor. Bulk material conveyor 9 constitutes a charging device extending in a plane above elongated conveyor 21 for transporting bulk material 10 to the loading station which is constituted by storage container 25 arranged to receive the bulk material from conveyor 9 and including a closable discharge chute arranged to discharge the stored bulk material from storage container 25 to transport container 15 at the loading station. Discharge chute 27 is operated by remote control from operator's cabin 26. The distance between the loading platform of end car 1 and the discharge end of chute 27 is at least equal to the height of the transport containers used.

The described arrangement of the intermediate storage of bulk material at the loading station has the considerable advantage that the loading and transport movements of the mobile crane along the train are independent of the storing of the bulk material, which further increases the capacity of the apparatus to handle large amounts of bulk material. Furthermore, it enables the loading of continuously delivered bulk material to be effected smoothly. The combination of the storage container with an upper conveyor charging the storage container with bulk material and a lower, reversibly movable conveyor for moving transport containers to and from the storage container for loading has the advantage of further reducing loading times and makes it possible to load the end car, which constitutes the loading station for all transport containers, with transport containers almost independently of the movements of the mobile crane. Thus, a long train with many cars can be loaded in a continuous manner with a single mobile crane.

As can be seen from FIG. 3, track means 17 for the mobile crane and elongated conveyor 21 for moving the transport containers on end car 1 overlap in the track direction. In this manner, mobile crane 18 handles only the lowering of the empty transport containers onto, and the lifting of the charged transport containers from, reversible conveyor 21, which aids in speeding the operation.

In the illustrated embodiments, the mobile crane comprises a boom mounted for pivoting in a vertical plane for lowering and raising the boom. In the embodiment of FIGS. 1 to 3, crane 18 comprises boom 29 on which device 28 for gripping, holding and lifting the transport containers is mounted.

The apparatus shown in FIGS. 1 to 3 is operated in the following manner:

As shown by arrows 7, the freight train may be moved along the track during the loading operation in either direction. A drive unit for the train may be mounted on end car 1 or on any other car, if desired, the train may have its own locomotive, or it may simply be coupled to track working machine 8 to be pulled or pushed thereby.

Bulk material 10 is continuously delivered by conveyor 10 from track working machine 8 to storage bin 25 and transport container 15, which has previously been moved into position below discharge chute 27 of the storage bin, is filled with bulk material. As schematically shown by motor 30, mobile crane 18 is self-propelled for driving on rails 17 along the train. Empty transport container 15 has been moved from its storage station on car 2 (indicated in broken lines) by mobile crane 18 to a position on elongated conveyor 21 which has been actuated to drive towards storage container 25 to place transport container 15 into the loading position shown in full lines. As the mobile crane drives container 15, transport containers 12 and 13 pass through its gantry 20. While transport container 15 is loaded, mobile crane 18 is driven back to transport container 16 shown in its storage position on car 3 (in broken lines). Empty transport container 16 is gripped and lifted by device 28, 29 on the crane and is driven above previously loaded transport containers 12, 13, 14 to the position above conveyor 21 shown in chain-dotted lines. As shown as loading of transport container 15 has been completed, entrainment conveyor 21 is again actuated to move in the opposite direction and drive full transport container 15 to the end of conveyor 21 opposite its end under storage bin 25 (see chain-double dotted lines), enabling the mobile crane to lower container 16 onto conveyor 21. The movement of the conveyor is now reversed to drive empty transport container 16 into the loading position under the storage bin while full transport container 15 is simultaneously driven back to a position under the mobile crane. Device 28, 29 is now operated to grip, lift and hold full container 15, and motor 30 is started to move the wheels of undercarriages 19 to drive mobile crane 18 back to deposit full transport container 15 in its storage position on car 2. The crane is then driven further back along the train in the direction of car 3 where it picks up empty transport container 31 (see FIG. 2) to repeat the cycle.

If the train is very long, i.e. a great number of cars are coupled together, more than one mobile crane may be provided for driving the transport containers between their storage and loading stations, each crane being arranged to handle a given number of transport containers. In this case, the transport containers are moved in synchronized cycles from car to car until they are stepwise brought to end car 1 where they are loaded and then similarly returned to storage positions on selected train cars. Such an arrangement will make it possible to load large quantities of bulk material in a very short time since the drive time for moving empty containers into the loading position and full containers from this position will be quite short.

A specific embodiment of a mobile crane incorporating a device for gripping, lifting and holding transport containers is illustrated in FIGS. 4 and 5, this embodiment being particularly useful for handling standard containers transportable on trucks and being arranged on the platforms of the train cars with their long sides substantially perpendicular to the track direction.

In this embodiment, platforms 32 of the flat cars used in the train have support flanges projecting from the platform in a plane below the platform and supporting a pair of rails 33 to the right and left of the transport containers 34 arranged on the platforms, mobile crane 35 being mounted on undercarriages 37 movable along the rails. Suitable wedge or stop elements are fixed to the platforms of the cars to seat the transport containers stored thereon and to hold them on the platforms against gliding during the movement of the train.

The illustrated containers are standard containers which may be loaded and transported on trucks, and which are provided with dogs 53 on the long side faces which extend perpendicularly to the track direction. The containers are in position for loading onto trucks parked alongside the track when dogs 53 are engaged by hooks 52 of device 49 for gripping, lifting and holding transport containers 34 in a manner to be described hereinafter.

As in the first described embodiment, mobile crane 35 has a gantry 36 permitting the transport containers stored on the platforms of the cars to pass therethrough as the crane is moved along the train to drive respective ones of the transport containers between the loading station and their storage station.

The mobile crane comprises outrigger arrangement 38 including boom 41 mounted on gantry 36 for pivoting about a vertical axis. A ring gear is affixed to the gantry and meshes with a pinion of motor 39 for pivoting boom 41 about the vertical axis, the motor being mounted on a support plate of outrigger arrangement 38. This plate also pivotally supports boom part 40, enabling boom 41 to be pivoted in a vertical plane for lowering and raising the boom by means of hydraulic jack 42. Telescoping boom part 43 cooperates with boom part 40 to enable boom 41 to be adjustable in length in a direction transverse to the track direction, the lengthwise adjustment being accomplished by drive 44. As described, the boom of mobile crane 35 is pivotal about a horizontal axis in a vertical plane and about a vertical axis in a horizontal plane, thus enabling it to be lowered and raised as well as repositioned in various horizontal positions. Furthermore, the boom is adjustable lengthwise.

Carrier yoke 45 of device 49 for gripping, holding and lifting the transport containers is mounted on boom part 43 for pivoting about horizontal pivot 46, jack 47 having respective ends linked to the carrier yoke and boom part 43 to pivot the yoke about pivot 46. Gripping device 49 is mounted on carrier yoke 45 for pivoting about pivot pins 48 extending perpendicularly to pivot 46. Respective ends of jack 50 are linked to the carrier yoke and gripping device 49 to pivot the device about pivot pins 48. The gripping device comprises two pivotal hooks 52 driven by jacks 51 for engagement with, and disengagement from, dogs 53 of the transport containers, thus enabling the transport containers to be gripped and held while being vertically and horizontally positioned by boom 41.

This embodiment is not only well adapted for use with standard transport containers but the pivotal arrangement of the boom of the mobile crane also makes it possible to position the containers suitably for unloading in suitable locations along the track, for instance on trucks parked next thereto. Loading and unloading are further facilitated by the adjustability of the length of the boom so that full transport containers may be readily placed not only on adjacently parked trucks but also on freight trains on an adjacent track, thus making special devices for unloading the containers, such as dump trucks, unnecessary. The entire arrangement makes full use of a relatively small loading and unloading space and increases the loading capacity of the cars while utilizing standard railroad cars and transport containers. The pivotal hooks on the gripping device are readily adapted for engagement with standard engagement elements on the transport containers.

As best shown in FIG. 5, supports 54 are mounted pivotally on gantry 36 of the mobile crane and are selectively pivotal laterally outwardly, as shown in broken lines in FIG. 5, by means of jacks 56. At the same time, the supports are extensible to the ground or ballast bed by means of jacks 55 so that the mobile crane may be supported on both sides of the track. This will stabilize the position of the crane during loading and unloading operations, particularly when boom part 43 is laterally extended, as shown in broken lines in FIG. 5. This crane support will greatly increase the stability of the crane even when the gage between car wheels 57 is narrow, thus stabilizing the crane during an unloading operation adjacent the track, as shown in broken lines in FIG. 5. Crane 35 is, therefore, not only useful in driving the transport containers along the train between the loading and storage positions of the containers on the train but also can be used for unloading the full transport containers from the train cars.

The lowered position of boom 41 is shown in broken lines in FIG. 4, centering of gripped transport container 34 and placing of the container on a flat support surface being facilitated during this pivotal movement of the boom in a vertical plane by operating of jack 47 to tilt the container gripping device so that the transport container bottom will be parallel to loading platform 32.

Mobile crane 35 is self-propelled, drive 58 being connected by a chain transmission (shown in broken lines) to undercarriages 37 to move the crane along rails 33. The crane drive may be a hydraulic motor reversible to move the crane in either direction, central drive unit 59 being mounted on the support plate of outrigger arrangement 38 to supply hydraulic fluid to the motor. This central drive unit may also supply hydraulic fluid to motors 47, 50 and 51. The operator's cabin may also be placed on the support platform and all crane drives may be controlled from this cabin. Obviously, the hydraulic drives may be replaced by pneumatic motors, electro-motors and any other suitable drive means.

Various modifications of specific structures illustrated and described herein by way of example will readily occur to those skilled in the art, particularly after benefitting from the present teaching, and the invention is defined by the claims.

What is claimed is:

1. A train of railroad cars for receiving, transporting and discharging bulk material, comprising
   (a) a succession of cars each having a loading platform coupled together for movement along a track,
   (b) a plurality of transport containers for the bulk material arranged on each of the loading platforms in succession in the direction of the track,
      (1) the successive loading platforms of the cars of the train defining a path for movement of the transport containers in the track direction,
   (c) a mobile gantry crane including a device for gripping, lifting and holding a respective one of the transport containers,
   (d) a continuous track means on the successive loading platforms and extending along the train in said direction laterally of the containers, the transport containers being arranged between the track means, the mobile crane being mounted on the track means for movement therealong and being adapted to grip respective ones of the transport containers and continuously to drive the gripped containers selectively along said path to and from a loading and a storage station on respective ones of the cars of the train, whereby successive ones of the containers may be loaded with the bulk material and the loaded containers may be stored on the platform of the cars, an end one of the cars comprising the loading station for successive ones of the transport containers,
   (e) a charging device for transporting bulk material to the loading station, and
   (f) a storage container arranged at the loading station to receive the bulk material from the charging device and to discharge the stored bulk material from the storage container to the transport container at the loading station.

2. A train of railroad cars for receiving, transporting and discharging bulk material, comprising
   (a) a succession of cars each having a loading platform coupled together for movement along a track,
   (b) a plurality of transport containers for the bulk material arranged on each of the loading platforms in succession in the direction of the track,
      (1) the successive loading platforms of the cars of the train defining a path of movement of the transport containers in the track direction,
   (c) a mobile crane including a device for gripping, lifting and holding a respective one of the transport containers,
   (d) a continuous track means extending along the train in said direction laterally of the containers, the mobile crane being mounted on the track means for movement therealong and being adapted to grip respective ones of the transport containers and continuously to drive the gripped containers selectively along said path to and from a loading and a storage station on respective ones of the cars of the train, whereby successive ones of the containers may be loaded with the bulk material and the loaded containers may be stored on the platforms of the cars, an end one of the cars comprising the loading station for successive ones of the transport containers,
   (e) an elongated conveyor mounted for reversible movement in the track direction on the platform of the end car and adapted to drive a respective one of the transport containers to and from the loading station upon the movement of the conveyor, and
   (f) a charging device extending in a plane above the elongated conveyor for transporting bulk material to the loading station.

3. The train of claim 1, wherein the elongated conveyor is an endless conveyor extending between the track means.

4. The train of claim 1, wherein the charging device comprises a conveyor of a ballast cleaning machine, the bulk material being received on the conveyor from the ballast cleaning machine.

5. The train of claim 1, further comprising a storage container for the bulk material, the storage container being arranged to receive the bulk material from the charging device and including a closable discharge chute arranged to discharge the stored bulk material from the storage container to the transport container at the loading station.

6. The train of claim 1, wherein the track means and the elongated conveyor overlap in the track direction.

* * * * *